US011928770B2

(12) United States Patent
Tsakok et al.

(10) Patent No.: US 11,928,770 B2
(45) Date of Patent: Mar. 12, 2024

(54) BVH NODE ORDERING FOR EFFICIENT RAY TRACING

(71) Applicant: Advanced Micro Devices, Inc., Santa Clara, CA (US)

(72) Inventors: John Alexandre Tsakok, Santa Clara, CA (US); Skyler Jonathon Saleh, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/562,271

(22) Filed: Dec. 27, 2021

(65) Prior Publication Data

US 2023/0206539 A1 Jun. 29, 2023

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01); *G06T 2210/21* (2013.01)

(58) Field of Classification Search
None
See application file for complete search history.

(56) References Cited

U.S. PATENT DOCUMENTS

| 11,087,522 | B1 | 8/2021 | Surti et al. | |
| 2016/0260245 | A1* | 9/2016 | DeCell | G06T 15/06 |
| 2017/0116760 | A1 | 4/2017 | Laine et al. | |
| 2020/0051315 | A1* | 2/2020 | Laine | G06T 17/005 |
| 2020/0193681 | A1* | 6/2020 | Saleh | G06T 15/80 |
| 2021/0049808 | A1 | 2/2021 | Janus et al. | |
| 2021/0209832 | A1 | 7/2021 | Saleh et al. | |
| 2021/0327118 | A1* | 10/2021 | Varadarajan | G06T 15/06 |
| 2021/0390758 | A1 | 12/2021 | Muthler et al. | |

OTHER PUBLICATIONS

Ylitie, H., et al., "Efficient Incoherent Ray Traversal on GPUs Through Compressed Wide BVHs", HPG '17: Proceedings of High Performance Graphics, Article No. 4, Jul. 2017, 13 pgs.

* cited by examiner

*Primary Examiner* — Andrew G Yang
(74) *Attorney, Agent, or Firm* — Volpe Koenig

(57) ABSTRACT

Methods and systems are disclosed for traversing nodes in a BVH tree by an intersection engine. Techniques disclosed comprise receiving, by the intersection engine, a traversal instruction, including a tracing-mode, ray data, and an identifier of a node to be traversed. Where the tracing-mode includes a closest hit mode and a first hit mode. If the node to be traversed is an internal node, the intersection engine determines, based on the tracing-mode, an order in which children nodes of the node are to be next traversed and output identifiers of the children nodes in the determined order.

24 Claims, 8 Drawing Sheets

BVH NODE ORDERING FOR EFFICIENT RAY TRACING

BACKGROUND

In a three-dimensional rendering of a scene, generally, standard rasterization techniques are used to render the scene's objects from a certain point of view. Additional effects, such as reflections or shadows, may then be added to the rendered scene image by tracing rays from various location points in the scene. For example, an object may be rendered by a standard rasterization, and, then, a ray from a location on the object to a source of light may be traced to add that light reflection effect to the object rendered image. In another example, a mirror may be rendered by a standard rasterization, and, then, a ray may be traced from a location on the mirror surface to the scene to find out what objects in the scene are reflected in the mirror. Such reflections can then be mapped onto the mirror image to be blended into the rendered image of the mirror.

Typically, the rendered scene is represented by a large number of primitives that represent graphical elements (e.g., triangles) and their associated geometrical and physical attributes. Rendering effects, performed through ray tracing, requires, for each ray, searching through these large number of primitives to find out any primitive or the closest primitive that intersects the ray, that is, a ray-intersecting primitive. For example, when a shadow effect is to be rendered, ray tracing involves searching for any primitive that may block the ray's path to a source of light. On the other hand, when a reflection effect is to be rendered, ray tracing involves searching for the closest primitive from which a light may be reflected.

Rendering of dynamic scenes, often applied in interactive video games, for example, requires real-time tracing of a large number of rays through a large number of primitives that constitute those scenes. Techniques are needed for efficient tracing of rays that allow for a reduced computation cost, and, thereby, enable real-time rendering of effects in dynamic scenes.

BRIEF DESCRIPTION OF THE DRAWINGS

A more detailed understanding may be had from the following description, given by way of example in conjunction with the accompanying drawings wherein.

DETAILED DESCRIPTION

Figure 1A:
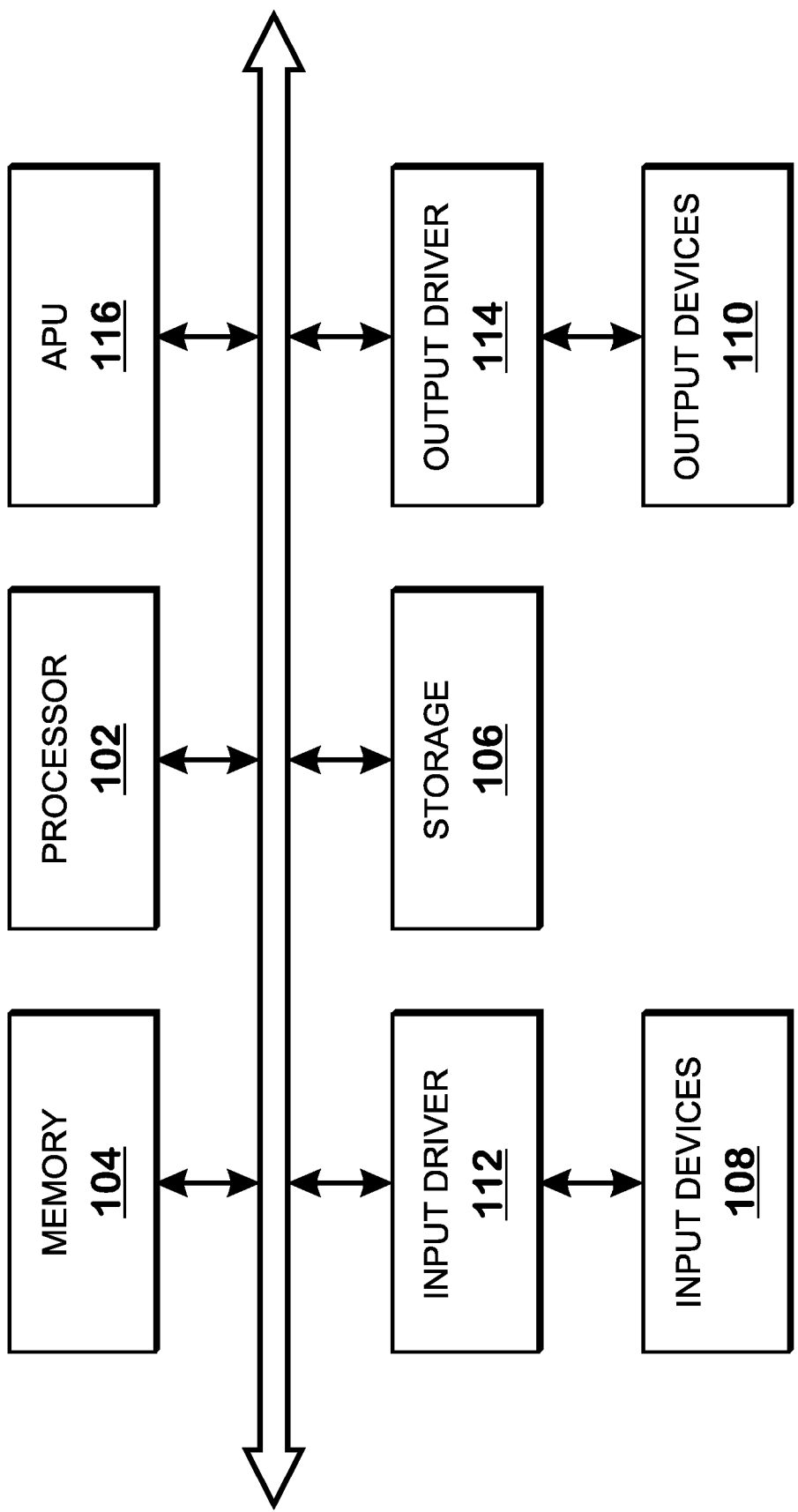
FIG. 1A is a block diagram of an example device, based on which one or more features of the disclosure can be implemented.

System and methods are disclosed in the present application for efficient rendering of effects based on ray tracing. Techniques disclosed herein accelerate ray tracing through improved operations of searching for ray-intersecting primitives. First, to facilitate an efficient search, primitives that represent a scene to be rendered are stored in a hierarchical structure, namely an acceleration structure. For example, an acceleration structure of a bounding volume hierarchy (BVH) tree that groups the primitives into bounding volumes can be used. Each bounding volume is associated with a node of the BVH tree, and each node branches out into other nodes or leaves of primitives. To efficiently search for a ray-intersecting primitive, aspects disclosed herein provide techniques for traversing through the nodes in an order that results in improved and consistent ray tracing performance.

As disclosed herein, searching for ray-intersecting primitives can be performed in two modes of operations: a closest hit mode and a first hit mode. In a closest hit mode, ray tracing involves searching for the closest primitive the ray intersects. This mode is typically used for rendering effects such as global illumination and light reflection. In a first hit mode of operation, tracing rays involves searching for any primitive the ray intersects (not necessarily the closest one). This mode is typically used for rendering effects such as ambient occlusion and shadow.

Aspects disclosed in the present application include methods for traversing nodes in a BVH tree by an intersection engine. The methods comprise receiving a traversal instruction, including a tracing-mode, ray data, and an identifier of a node to be traversed, wherein the tracing-mode comprises a closest hit mode and a first hit mode. If the node to be traversed is an internal node, the methods further comprise determining, based on the tracing-mode, an order in which children nodes of the node are to be next traversed; and, then, outputting identifiers of the children nodes in the determined order.

Aspects disclosed herein also describe systems for traversing nodes in a BVH tree. The systems include at least one processor and memory storing instructions. The instructions, when executed by the at least one processor, cause the engine to receive a traversal instruction, including a tracing-mode, ray data, and an identifier of a node to be traversed, wherein the tracing-mode comprises a closest hit mode and a first hit mode. If the node to be traversed is an internal node, the instructions further cause the engine to determine, based on the tracing-mode, an order in which children nodes of the node are to be next traversed; and, then, to output identifiers of the children nodes in the determined order.

Further, aspects disclosed herein describe a non-transitory computer-readable medium comprising instructions executable by at least one processor to perform methods for traversing nodes in a BVH tree by an intersection engine. The methods comprise receiving a traversal instruction, including a tracing-mode, ray data, and an identifier of a node to be traversed, wherein the tracing-mode comprises a closest hit mode and a first hit mode. If the node to be traversed is an internal node, the methods further comprise determining, based on the tracing-mode, an order in which children nodes of the node are to be next traversed; and, then, outputting identifiers of the children nodes in the determined order.

FIG. 1A is a block diagram of an example device 100A, based on which one or more features of the disclosure can be implemented. The device 100A can be, for example, a computer, a gaming device, a handheld device, a set-top box, a television, a mobile phone, or a tablet computer. The device 100A includes a processor 102, an accelerated processing unit (APU) 116, memory 104, storage 106, one or more input devices 108, and one or more output devices 110. The device 100A can also include an input driver 112 and an output driver 114. In an aspect, the device 100A can include additional components not shown in FIG. 1.

The processor 102 can include a central processing unit (CPU) or one or more cores of CPUs. The APU 116, representing a shader system or graphics processing unit (GPU), can include one or more cores of APUs. The processor 102 and the APU 116 may be located on the same die or on separate dies. The memory 104 can be located on the same die as the processor 102, or can be located separately from the processor 102. The memory 104 can include volatile or non-volatile memory, for example, random access memory (RAM), dynamic RAM, a cache, or a combination thereof.

The storage 106 can include fixed or removable storage, for example, a hard disk drive, a solid-state drive, an optical disk, or a flash drive. The input devices 108 can include, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output devices 110 can include, for example, a display, a speaker, a printer, a haptic feedback device, one or more lights, an antenna, or a network connection (e.g., a wireless local area network card for transmission of wireless IEEE 802 signals).

The input driver 112 communicates with the processor 102 and the input devices 108, and facilitates the receiving of input from the input devices 108 to the processor 102. The output driver 114 communicates with the processor 102 and the output devices 110, and facilitates the sending of output from the processor 102 to the output devices 110. In an aspect, the input driver 112 and the output driver 114 are optional components, and the device 100A can operate in the same manner when the input driver 112 and the output driver 114 are not present.

The APU 116 can be configured to accept compute commands and graphics rendering commands from processor 102, to process those compute and graphics rendering commands, and/or to provide output to a display (output device 110). As described in further detail below, the APU 116 can include one or more parallel processing units configured to perform computations, for example, in accordance with a single instruction multiple data (SIMD) paradigm. Thus, although various functionality is described herein as being performed by or in conjunction with the APU 116, in various alternatives, the functionality described as being performed by the APU 116 can be additionally or alternatively performed by other computing devices having similar capabilities that are not driven by a host processor (e.g., processor 102) and that can be configured to provide, for example, graphical output to a display. Whether or not a processing system can perform processing tasks in accordance with a SIMD paradigm, the processing system can be configured to perform the functionality described herein.

Figure 1B:
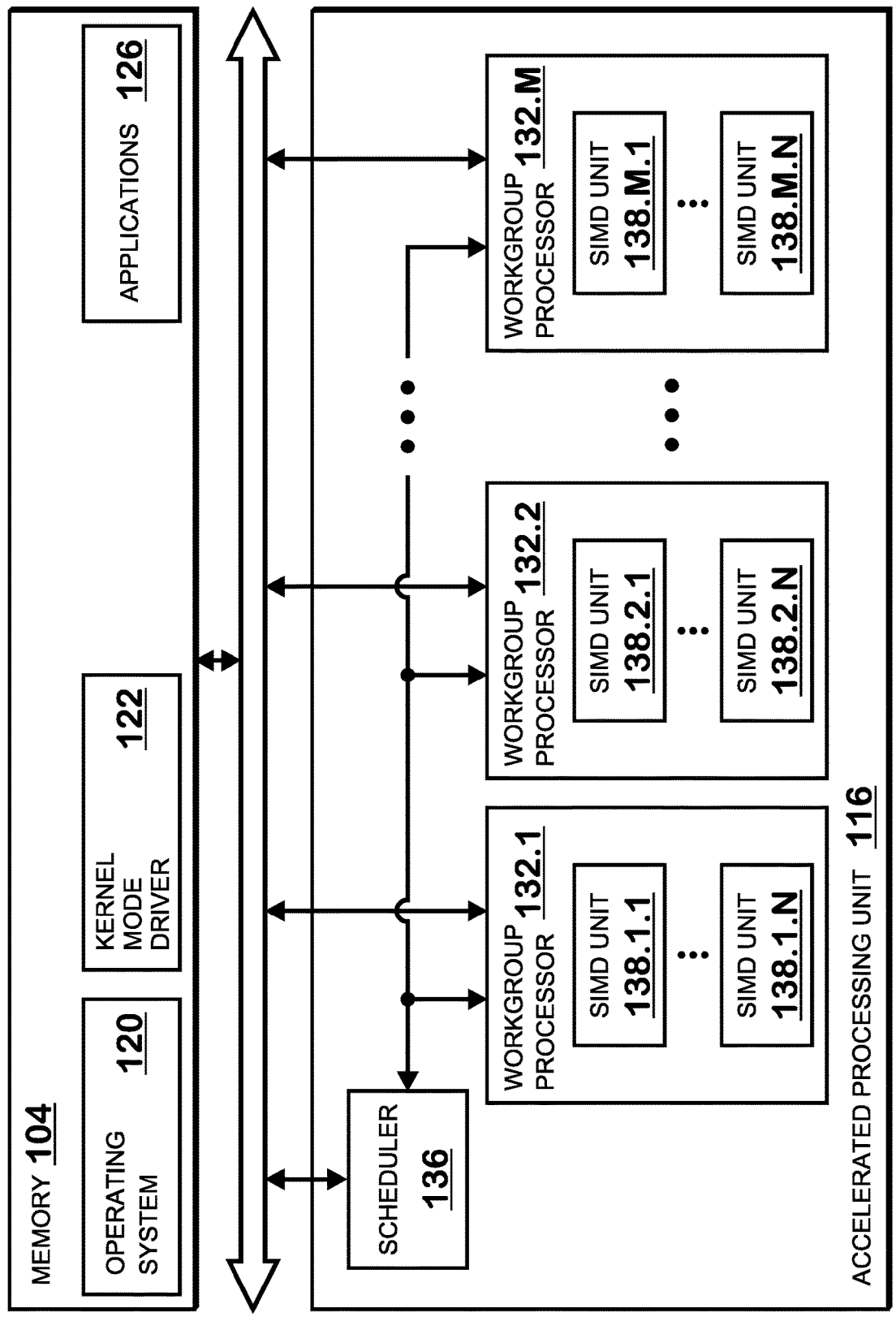
FIG. 1B is a block diagram of an example system, demonstrating a shader system employable by the device of FIG. 1A, based on which one or more features of the disclosure can be implemented.

FIG. 1B is a block diagram of an example system 100B, demonstrating a shader system employable by the device of FIG. 1A, based on which one or more features of the disclosure can be implemented. FIG. 1B illustrates in further detail the execution of processing tasks on APU 116. The processor 102 can maintain in memory 104 one or more modules for execution by the processor 102. The modules include an operating system 120, a kernel mode driver 122, and applications 126. These modules can control various features of the operation of the processor 102 and the APU 116. For example, the operating system 120 can provide system calls, that is, application programming interfaces (APIs), that can be employed by applications 126 to directly interface with the hardware. The kernel mode driver 122 can control operation of the APU 116 by, for example, providing APIs to applications 126 executing on the processor 102 to access various functionality of the APU 116. The kernel mode driver 122 can also include a just-in-time compiler that compiles programs for execution by processing components of the APU 116 (such as the SIMD units 138 discussed in further detail below).

The APU 116 can execute commands and programs for graphics operations and non-graphics operations, including either parallel processing or sequential processing and either ordered or non-ordered processing. The APU 116 can be used for executing graphics pipeline operations—such as operations that process pixels and/or geometric computations (e.g., rendering an image to the display (output device 110))— based on commands received from the processor 102. The APU 116 can also execute processing operations that are not related to graphics operations, such as operations related to video, physics simulations, computational fluid dynamics, or other tasks, based on commands received from the processor 102.

The APU 116 can include WGPs 132.1-M; each WGP, e.g., 132.1, can have one or more SIMD units, e.g., 138.1.1-N, that can perform operations at the request of the processor 102 in a parallel manner according to a SIMD paradigm. The SIMD paradigm is one in which multiple processing elements share a single program control flow unit and program counter and, thus, can execute the same program but on different data. In one example, each SIMD unit, e.g., 138.1.1, can run 64 lanes (i.e., threads), where each lane executes the same instruction at the same time as the other lanes in the SIMD unit, but executes that instruction on different data. Lanes can be switched off with predication, such as when not all the lanes are needed to execute a given instruction. Predication can also be used to execute programs with divergent control flows. Specifically, for programs with conditional branches or other instructions where control flow is based on calculations performed by an individual lane, predication of lanes corresponding to control flow paths not currently being executed (and serial execution of different control flow paths) allows for arbitrary control flow. In an aspect, each of the WGPs 132.1-M can have a local cache. In another aspect, multiple WGPs can share a cache.

The basic unit of execution in a WGP, e.g., 132.1, is a work-item. Typically, each work-item represents a single instantiation of a program that can be executed in parallel in a particular lane. Work-items can be executed simultaneously as a "wavefront" (or a "wave") on a single SIMD, e.g., 138.1.1. One or more waves can be run in a workgroup, each wave including a collection of work-items designated to execute the same program. A workgroup is executed by executing each of the waves that make up the workgroup. The waves can also be executed sequentially on a single SIMD unit or partially or fully in parallel on different SIMD units, 138.1-N. Thus, a wave can be thought of as a collection of work-items that can be executed simultaneously on a single SIMD unit e.g., 138.1.1. Thus, if commands received from the processor 102 indicate that a particular program is to be parallelized to such a degree that the program cannot be executed on a single SIMD unit simultaneously, then that program can be broken up into waves which can be parallelized on two or more SIMD units (e.g., 138.1.1-N), serialized on the same SIMD unit (e.g., 138.1.1.), or both parallelized and serialized as needed. A scheduler 136 can be configured to perform operations related to launching various waves on the different WGPs 132.1-M and their respective SIMD units.

The parallelism afforded by the WGPs 132.1-M is suitable, for example, for graphics-related operations such as operations on pixel values (e.g., filter operations), operations on geometrical data (e.g., vertex transformations), and other graphics related operations. For example, an application 126, executing on the processor 102, can involve computations to be performed by the APU 116. The application 126 can use APIs provided by the kernel mode driver 122 to issue processing commands to the APU 116. The processing commands are then provided to the scheduler 136. The scheduler 136 translates the processing commands into computation tasks that are assigned to the WGPs 132.1-M for execution in parallel. For example, the scheduler 136 may receive a processing command that includes instructions to be perform on data (e.g., 1024 pixels of an image). In response, the scheduler 136 can chunk the data into groups (e.g., each group containing data required for the processing of 64 pixels) and launch waves in one or more WGPs, each wave associated with a group of data and instructions to perform on the data. For example, the scheduler 136 may launch 16 waves (e.g., each in charge of processing 64 pixels) to be executed in SIMDs 138 of one or more WGPs 132.

Figure 2:
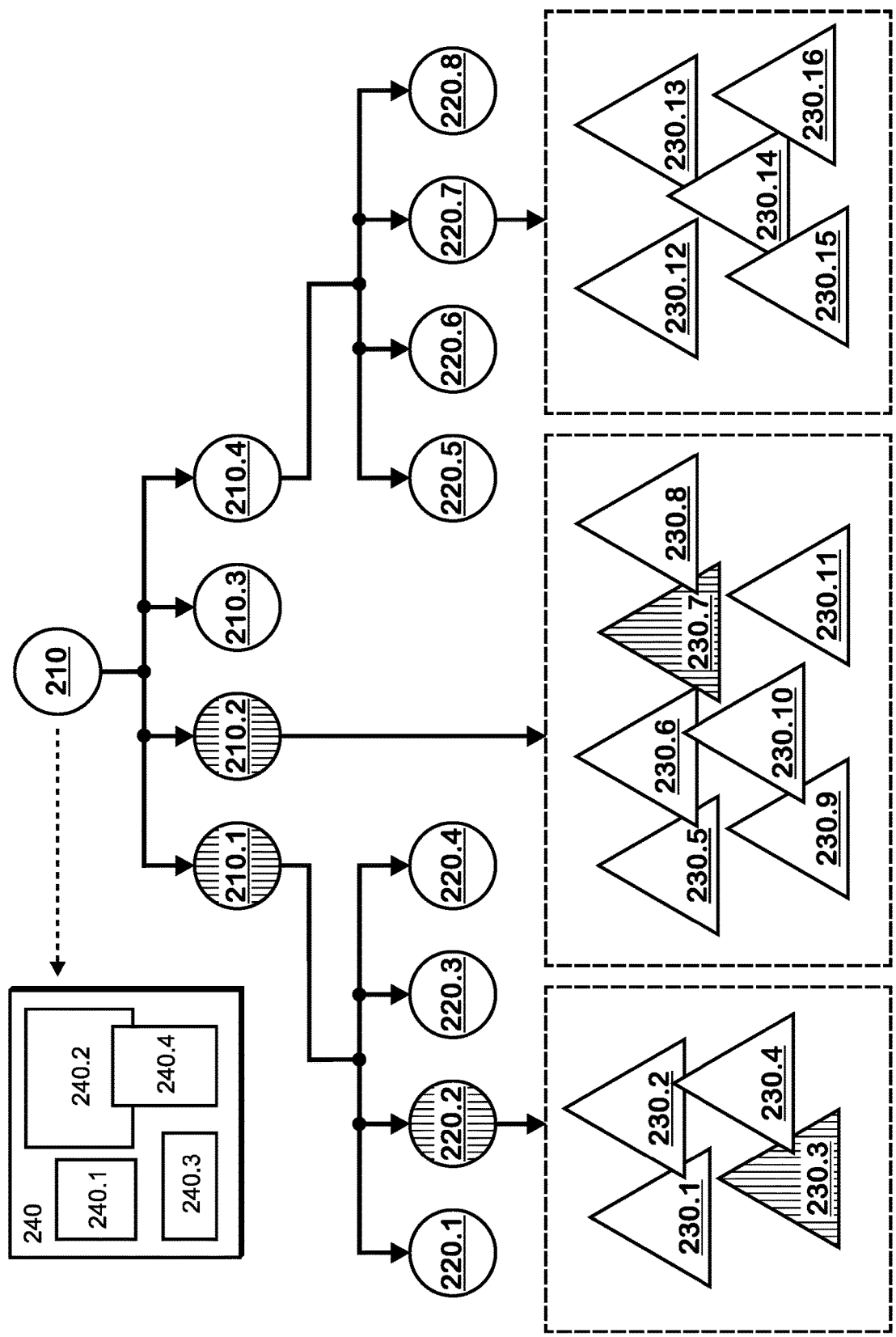
FIG. 2 demonstrates a traversing operation through an example bounding volume hierarchy (BVH) acceleration structure, based on which one or more features of the disclosure can be implemented.

FIG. 2 demonstrates a traversing operation through an example BVH acceleration structure 200, based on which one or more features of the disclosure can be implemented. The BVH tree 200 demonstrates nodes connected in a quad-tree hierarchy. Each node in the tree is associated with a volume that spatially encloses on the primitives located within its boundaries. For example, the root node 210 is associated with a volume 240 that spatially encloses on all the primitives that represent the scene, while its children nodes 210.1-4 are associated with respective volumes 240.1-4, each of which spatially encloses on a part of the primitives that are enclosed by the volume 240 associated with the parent node 210. Note that two nodes may be associated with respective volumes that enclose on the same primitives, that is, the respective volumes overlap. Assuming the scene is represented by N primitives (16 of which are shown in FIG. 2 as primitives 230.1-16) in order to find a ray-intersecting primitive, the straightforward way is to exhaustively search (namely, traverse) across all the N primitives. However, to conform to real-time system requirements, only a part of the primitives is traversed, as further disclosed below.

The BVH tree 200 representation of a scene starts at the top of the tree with root node 210. The root node 210 branches out into four children nodes 210.1-4. Each node is associated with a volume that spatially confines (by its boundaries) a part of the primitives of the scene. A node that branches out into other nodes is referred to herein as an internal node. A node that branches out into leaves of primitives is referred to herein as an external node. For example, internal node 210.1 branches out into four children nodes 220.1-4; each of these four nodes is associated with a volume that spatially confines by its boundaries a part of the primitives that are spatially confined by the volume associated with the parent node 210.1. Similarly, internal node 210.4 branches out into other four children nodes 220.5-8; each of these four nodes is associated with a volume that spatially confines by its boundaries a part of the primitives that are spatially confined by the volume associated with the parent node 210.4. At the bottom of the tree, external nodes branch out into leaves of primitives. For example, external node 220.2 branches out to leaves 230.1-230.4 (that is, the volume associated with node 220.2 spatially confines by its boundaries the primitives represented by leaves 230.1-230.4), external node 210.2 branches out into leaves 230.5-230.11 (that is, the volume associated with node 210.2 spatially confines by its boundaries the primitives represented by leaves 230.5-230.11), and external node 220.7 branches into leaves 230.12-230.16 (that is, the volume associated with node 220.7 spatially confines by its boundaries the primitives represented by leaves 230.12-230.16).

Traversing through the BVH tree 200 is carried out with respect to a given ray defined by its origin in the scene, orientation, and length. Traversing, in general, is done against internal nodes and external nodes in the BVH tree 200. Traversing an internal node—namely, an internal node traversal operation—involves, first, determining which of the volumes associated with the children nodes (of the internal node) intersects with the ray, and, second, determining an order in which those ray-intersecting children nodes will be traversed. The determined order can be provided in a list of ordered node identifiers (e.g., pointers) that may be maintained in a stack. Thus, pointers to the children nodes can be pushed into a last in first out (LIFO) stack in the determined order, so that a children node whose pointer was pushed last into the stack will be popped out first, and so, will be the one to be traversed next. On the other hand, traversing an external node—namely, an external node traversal operation—involves determining which (if any) of the primitives of the leaves contained by the volume associated with the external node intersects with the ray. Based on a tracing-mode parameter, determining a ray-intersecting primitive may involve searching for any ray-intersecting primitive (in a first hit mode) or searching for the closest ray-intersecting primitive to the ray's origin (in a closest hit mode).

Traversing the BVH tree 200 with respect to a given ray, starts with traversing the root node, internal node 210. Thus, an internal node traversal operation is applied to first determine which of the volumes associated with nodes 210.1-4 intersects with the ray, and, then, to push pointers to those ray-intersecting nodes into a LIFO stack in a certain order. For example, assuming the ray first intersects with the volume associated with internal node 210.1 and then with the volume associated with external node 210.2. In this case, a pointer to node 210.2 is pushed first into the stack and a pointer to node 210.1 is pushed second into the stack. Thus, the next node to be traversed is the node that is next popped from the stack, that is, internal node 210.1. Accordingly, an internal node traversal operation is applied to first determine which of the volumes associated with node 210.1's children nodes 220.1-4 intersects with the ray, and, then, to insert pointers to those ray-intersecting nodes into the LIFO stack in a certain order. Assuming the ray only intersects with the volume associated with external node 220.2. In this case, only a pointer to external node 220.2 is pushed into the stack that now stores both the pointer to node 210.2 and the pointer to node 220.2. The next node to be traversed then is node 220.2 (as its pointer was pushed last into the stack), after which node 210.2 will be traversed.

As nodes 210.2 and 220.2 are both external nodes, an external node traversal operation should be applied, in which primitives contained by the volumes associated with nodes 210.2 and 220.2 are searched to find either any primitive or the closest primitive that intersects with the given ray. As mentioned above, the given ray is defined by its origin, $R_{origin}$, orientation, $R_{orientation}$, and length, $R_{length}$ Accordingly, a ray extends between the location in the scene it is originated from: $R_{origin}$, and the location in the scene it is ending at: $R_{end}=R_{origin}+R_{length} \cdot R_{orientation}$. Thus, to intersect a given ray, a primitive has to intersect a line that extends between $R_{origin}$ and $R_{end}$. As disclosed herein, when the closest intersecting primitive is sought, each time a primitive is found to be intersecting with the ray, the ray data is updated, so that the ray ends at the location of that intersecting primitive, that is, $R_{length}$ is updated (shorten). Updating the ray length in this manner reduces the number of volumes (associated with children nodes) the ray intersects, as is explained further below.

Assuming the tracing-mode is set to a closest hit mode, a traversal operation through nodes 210.2 and 220.2 is applied as follows. First, external node 220.2 is traversed by finding which of the leaves (primitives) 230.1-230.4 (confined by node 220.2 associated volume) first intersects with the ray (i.e., the closest ray-intersecting primitive to the ray's origin). If, for example, primitive 230.3 is the first to intersect, it will be saved as the candidate for the closest ray-intersecting primitive and the ray's length value will be updated so that the ray ends at the location of this primitive 230.3. Then, node 210.2 is traversed by finding which of the leaves (primitives) 230.5-230.11 (confined by node 210.2 associated volumes) is first to intersect with the ray. If, for example, leaf 230.7 is the first to intersect, it will replace the current candidate for the closest ray-intersecting primitive (that is leaf 230.3). If leaf 230.7 intersects the ray before that current candidate 230.3, then leaf 230.7 is determined as the final result for the closest ray-intersecting primitive, as, in this example, there are no more nodes pointed to in the stack to traverse through. If the tracing-mode is set to a first hit mode, then once a ray-intersecting primitive is found that primitive is determined as the final result and the traversal operation ends. Note that in this example only the primitives (leaves) that are confined by ray-intersecting volumes (those associated with internal nodes 210.1, 210.2, and 210.2) have been traversed, and, thus, the computational cost is much lower compared to traversing through all the primitives.

Figure 3:
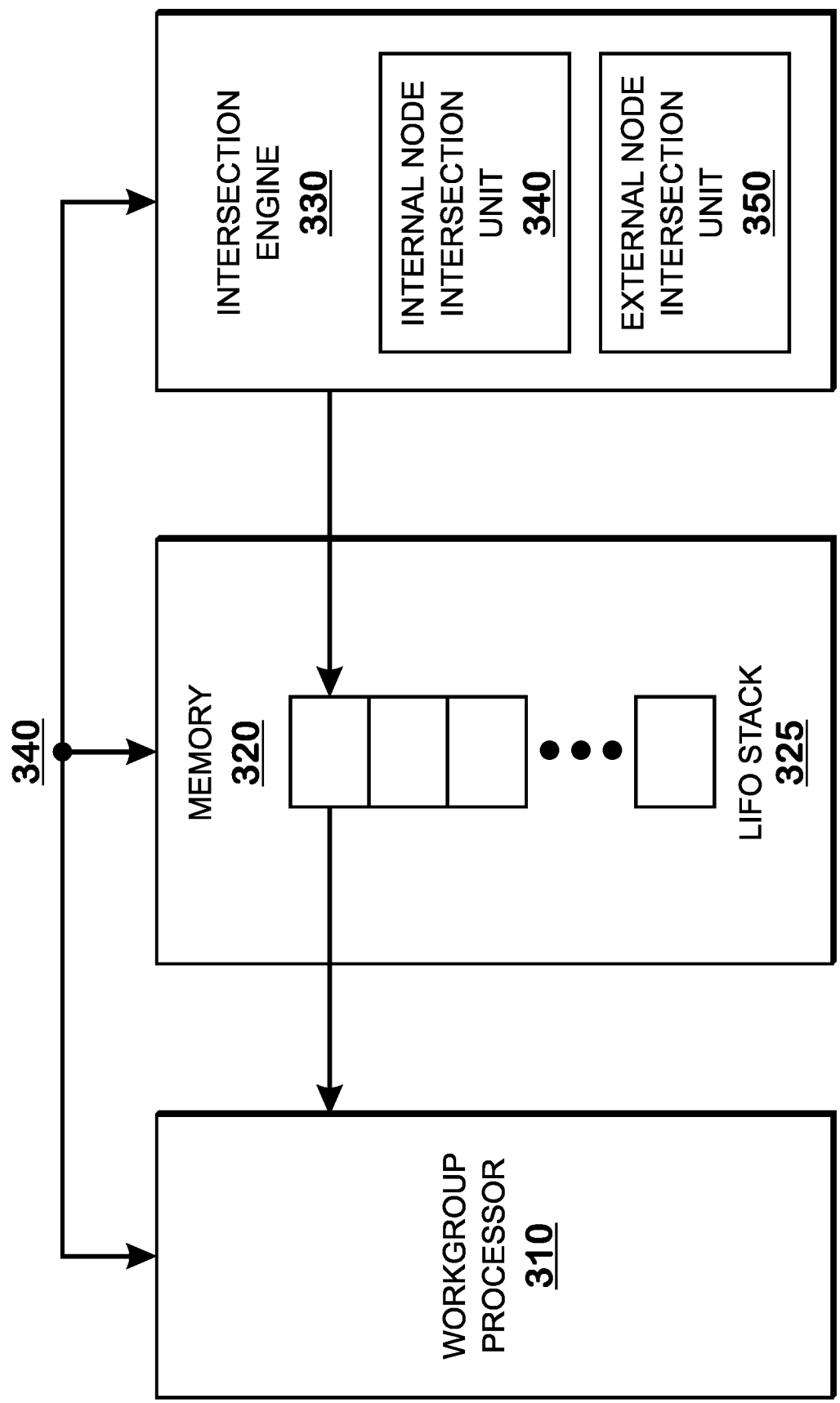
FIG. 3 is a functional block diagram of an example system for ray tracing, based on which one or more features of the disclosure can be implemented.

FIG. 3 is a functional block diagram of an example system 300 for ray tracing, based on which one or more features of the disclosure can be implemented. The system 300 includes a workgroup processor 310, memory 320, and an intersection engine 330, communicatively connected via a communication link 340. The workgroup processor 310 can be representative of one or more of the workgroup processors 132.1-M described in reference to FIG. 1B. The intersection engine 330 can be a fixed function hardware including circuitry that is configured to perform the traversal operations disclosed herein. The workgroup processor 310 is configured to execute shader programs (e.g., run by one or more SIMDs 138) which control the traversal operations performed by the intersection engine 330. In response to traversal instructions from the workgroup processor 310, the intersection engine 330 is configured to perform internal node traversal operations and external node traversal operations (as described in reference to FIG. 2) and communicate the results via backward path communication 340 to the workgroup processor 310. In an aspect, the intersection engine 330 includes an internal node intersection unit 340 and an external node intersection unit 350 that are configured to employ, respectively, the internal node traversal operations and the external node traversal operations disclosed herein. These units 340, 350 may operate in parallel or sequentially when employing their respective traversal operations. In another aspect, the intersection engine's 330 functions, as disclosed herein, can be implemented by shader programs that are executed by the workgroup processor 310. The memory can be internal to the workgroup processor 310 (e.g., local data share (LDS) memory) or can be any shared memory external to the workgroup processor 310. The system 300 may implement a LIFO stack 325 in the memory 320 so that identifiers of (or pointers to) the BVH tree's 200 nodes) that are pushed last into the stack 325 by the intersection engine 330 can be popped first by the workgroup processor 310.

In an aspect, the ray tracing operation, described in reference to FIG. 2, is a recursive process conducted as follows. The workgroup processor 310 sends a traversal instruction to the intersection engine 330 via a forward path communication 340. The traversal instruction contains a tracing-mode, ray data (including the ray's origin, orientation, and length), and an identifier of (or a pointer to) a node (in a BVH tree) to be traversed. Based on the node pointer, the intersection engine 330 is configured to fetch from memory 320 node associated data, according to which it is determined whether the node is an external node or an internal node, and so the type of respective traversal operation to be employed—an internal node traversal operation or an external node traversal operation. The tracing-mode (provided in the traversal instruction) indicates whether the engine should return any ray-intersecting primitive or the closest ray-intersecting primitive.

Hence, when an internal node traversal operation should be employed, the engine 330, via its internal node intersection unit 340, finds the ray-intersecting children nodes of the given node, orders them, and pushes them into the stack 325 according to their order (as explained in reference to FIG. 2). The engine 330 then communicates back 340 to the workgroup processor 310 that this traversal operation is completed. In response, the workgroup processor 310 pops out from the stack a pointer to a next node to be traversed and sends another traversal instruction to the intersection engine 330, including the tracing-mode, the ray data, and a pointer to that next node to be traversed. When an external node traversal operation should be employed, the intersection engine 330, via its external node intersection unit 350, traverses trough the leaves (primitives) of the given node to find either any ray-intersecting primitive or a closest ray-intersecting primitive (depending on the tracing-mode as explained above). Then, if a ray-intersecting primitive was found, the engine 330 communicates back 340 to the workgroup processor 310 the found ray-intersecting primitive. When any ray-intersecting primitive is sought, the ray tracing operation is completed. Otherwise, when the closest ray-intersecting primitive is sought, then if the provided ray-intersecting primitive is closer to the ray's origin than a stored candidate, the workgroup processor 310 updates the stored candidate with the provided ray-intersecting primitive and also updates the ray length (in the ray data) based on the location of the updated candidate. Then, again, the workgroup processor 310 pops out of the stack a pointer to the next node to be traversed and sends another traversal instruction to the intersection engine 330, including the tracing-mode, the ray data, and a pointer to that next node to be traversed. This process in which 1) the workgroup processor 310 sends a traversal instruction to the intersection engine 330 with a pointer to a node to be traversed (popped from the stack) and 2) the intersection engine 330 pushes into the stack internal nodes to be next traversed (and/or returns a ray-intersecting primitive to be compared against the stored candidate for ray-intersecting primitive) recursively continues until there are no more pointers in the stack to be traversed. At this point the stored candidate is the result for the closest ray-intersecting primitive.

Figure 4:
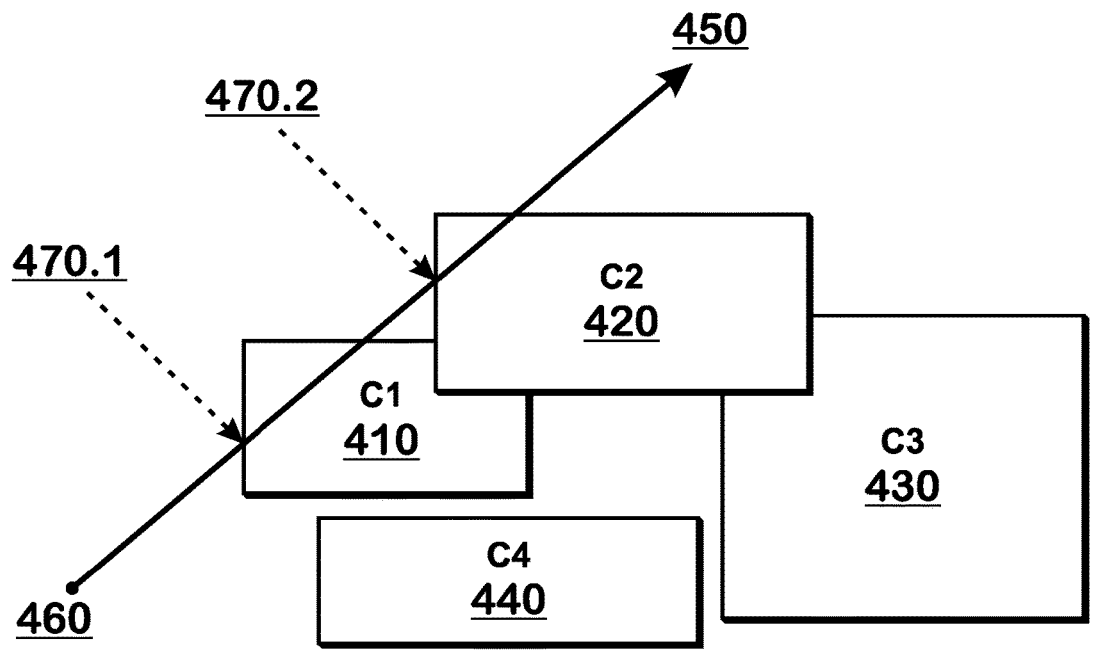
FIG. 4 demonstrates ordering of children nodes in an example BVH, based on which one or more features of the disclosure can be implemented.
Figure 5:
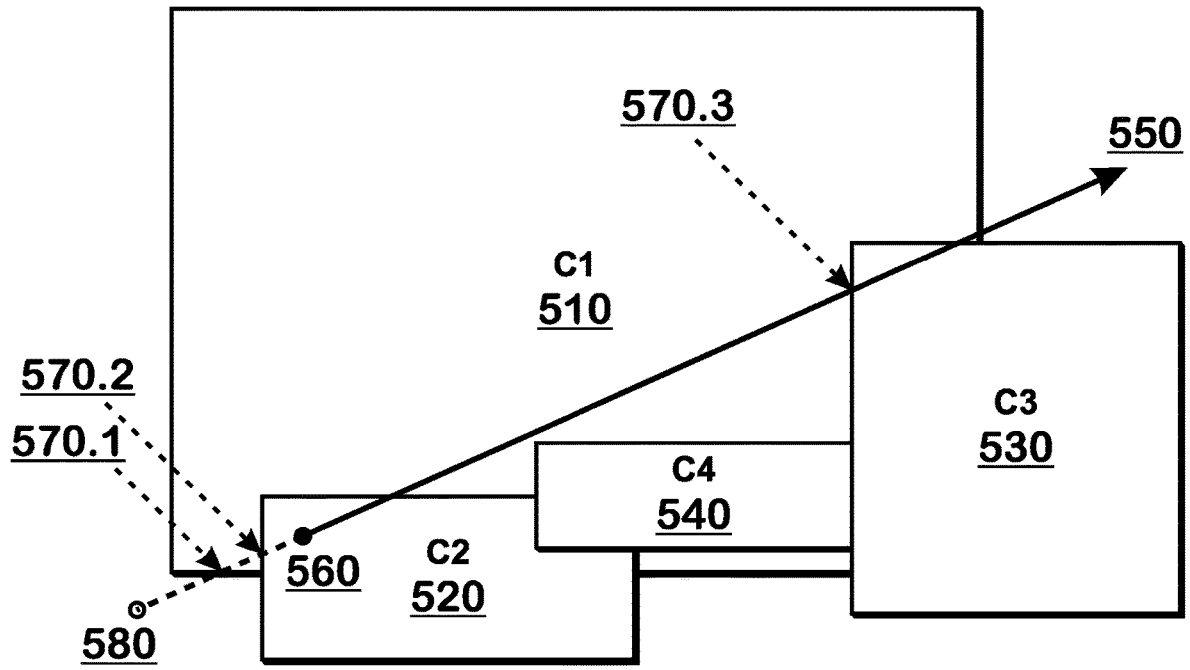
FIG. 5 demonstrates ordering of children nodes in another example BVH, based on which one or more features of the disclosure can be implemented.
Figure 6:
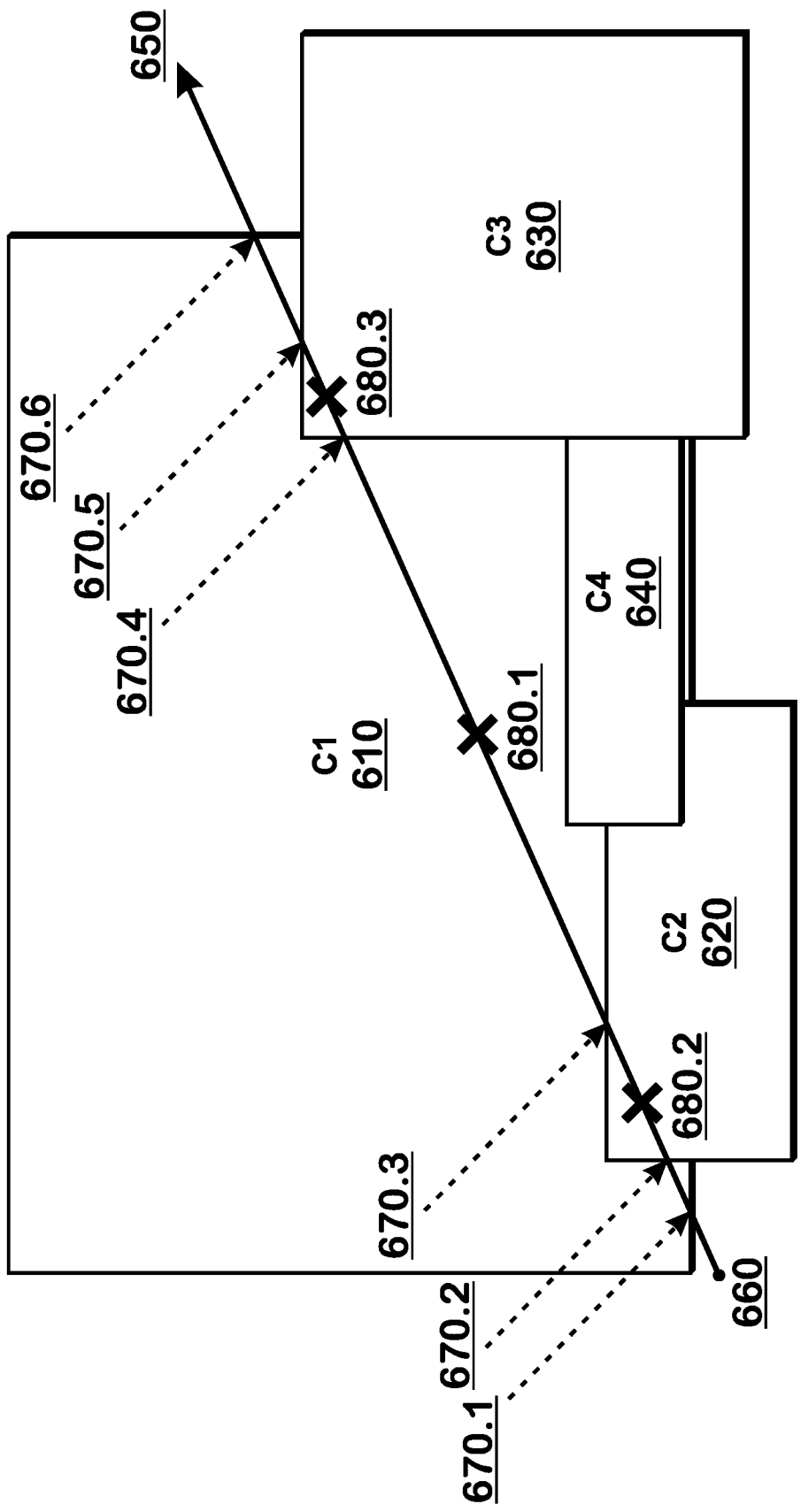
FIG. 6 demonstrates ordering of children nodes in an example BVH for a closest hit mode of operation, based on which one or more features of the disclosure can be implemented.
Figure 7:
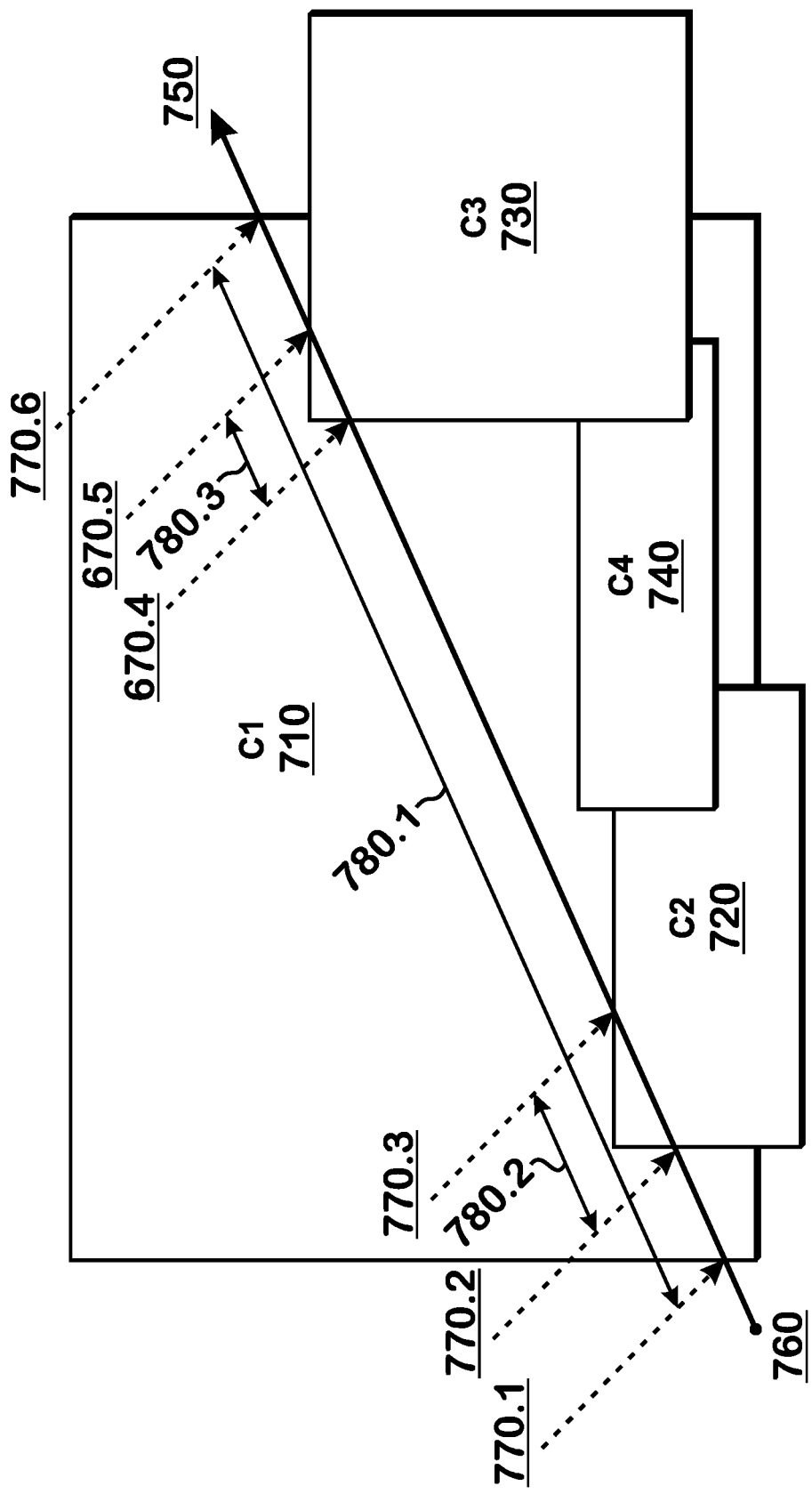
FIG. 7 demonstrates ordering of children nodes in an example BVH for a first hit mode of operation, based on which one or more features of the disclosure can be implemented.

Using a BVH tree 200 for ray tracing reduces the time it takes to find a ray-intersecting primitive, as only nodes that are associated with volumes that are hit by the ray are traversed. That is, only volumes that intersect with the ray are searched within for ray-intersecting primitives. Hence, a significant gain in performance is achieved compared to an exhaustive search across all primitives. Further, the system's 300 performance of a ray tracing operation is affected by the ordering of the children nodes, carried out by the internal node intersection unit 340, as described in reference to FIGS. 2-3. To further reduce the time it takes to find a ray-intersecting primitive, as disclosed herein, the intersection engine 330 is employed in two different tracing-modes. FIGS. 4-7 demonstrate the ordering of children nodes of an internal node being traversed in a BVH tree 200. The volumes associated with the children nodes are shown as two-dimensional rectangles for simplicity of presentation. FIGS. 4-5 demonstrate the conventional approach for ordering. FIGS. 6-7 demonstrate ordering that is performed under different tracing modes—that is, the closest hit mode is used when the sought-after primitive is the closest ray-intersecting primitive (as discussed in reference to FIG. 6) and the first hit mode is set when the sought-after primitive is any ray-intersecting primitive (as discussed in reference to FIG. 7).

FIG. 4 demonstrates ordering of children nodes in an example BVH 400, based on which one or more features of the disclosure can be implemented. FIG. 4 shows four bounding volumes: C1 410, C2 420, C3 430, and C4 440. Each of these volumes is associated with a children node (e.g., one of the children nodes 210.1-4 of internal node 210, shown in FIG. 2). A ray to be traced originates from a location at the scene, e.g., 460, ends at a location at the scene 450 according to the ray length, and propagates at a certain orientation. Based on the ray's origin, length, and orientation, the ray intersects with only some of the volumes, that is, C1 410 and C2 420. Only these nodes that are associated with C1 410 and C2 420 have to be traversed in order to find the primitive that the ray intersects. To further speed up the time a ray-intersecting primitive can be found, C1 410 and C2 420 are ordered according to a presumed respective likelihood that a volume contains the sought-after ray-intersecting primitive. For example, when the sought-after ray-intersecting primitive is the one that is located closest to the ray's origin (i.e., closest ray-intersecting primitive) then, the closest volume to the ray origin is most likely to contain that primitive. Accordingly, C1 410 and C2 420 can be ordered according to their respective distances between the origin of the ray and the respective locations at which the ray intersects with (enters) these volumes. For example, a first distance associated with C1 410 is the distance between the origin 460 and location 470.1 and a second distance associated with C2 420 is the distance between the origin 460 and location 470.2. Since, the first distance is shorter than the second distance, these volumes can be ordered so that C1 410 is first and C2 420 is second—that is, nodes and leaves that branch out from the node associated with C1 410 will be traversed before nodes and leaves that branch out from the node associated with C2 420.

FIG. 5 demonstrates ordering of children nodes in another example BVH 500, based on which one or more features of the disclosure can be implemented. FIG. 5 shows four bounding volumes: C1 510, C2 520, C3 530, and C4 540. As before, each of these volumes is associated with a children node (e.g., one of the children nodes 210.1-4 of internal node 210, shown in FIG. 2). In this example, a ray to be traced originates from a location at the scene 560 that is within two spatially overlapping volumes C1 510 and C2 520. Based on the ray's origin, length, and orientation, the ray intersects with only some of the volumes, that is, C1 510, C2 520, and C3 530. Hence, in order to find the primitive that the ray intersects with, only nodes associated with volumes C1 510, C2 520, and C3 530 will be traversed. As before, C1 510, C2 520, and C3 530 are ordered based on their respective distances between the origin of the ray 560 and locations at which the ray intersects with (enters) these volumes. However, in this example, since the ray originates from within C1 510 and C2 520, the respective distances are negative. Thus, a first distance associated with C1 510 is a negative distance between the origin 560 and location 570.1, a second distance associated with C2 520 is a negative distance between the origin 560 and location 570.2, and a third distance associated with C3 530 is a positive distance between the origin 560 and location 570.3. In such a case, the first and second negative distances will be clamped to zero by the intersection engine 330, and, thus, the resulting order will be determined randomly: either C1, C2, and C3 or C2, C1, and C3. Such a situation can result in an undesired random variation in performance.

For example, when the sought-after primitive is the closest ray-intersecting primitive, performance may decrease if C1 is searched before C2 (i.e., if the determined order is C1, C2, and C3) when C1 is positioned behind C2 relative to the origin of the ray, as it is more likely that the closest ray-intersecting primitive resides within C2. Additionally, since the cost of traversing through a large volume (associated with a node that branches out into many layers of internal nodes) is higher than traversing through a smaller volume (associated with a node that branches out into few internal nodes) traversing first through C2 is preferred.

The inefficiency in the searching process described above can occur also in situations where the ray 550 starts from a location external to C1 510 and C2 520. For example, the ray can originate from a location 580 that is external to C1 510 and C2 520, as illustrated in FIG. 5. In this case, the ordering of C1 510 and C2 520 according to a first distance (between the ray origin 580 and intersection 570.1) and a second distance (between the ray origin 580 and intersection 570.2) still may result in non-optimal searching performance as before, as the order in this case is again C1, C2, and C3. In this case, since C1 and C2 are overlapping volumes, even though the ray hits C1 510 first 570.1 and a portion of C1 510 may be before C2 520, most of C1 is behind C2, and so it is more likely that the closest ray-intersecting primitive resides within C2. Further, as explained above, when the volumes are overlapping, it is preferred to traverse first through a node associated with a smaller volume (e.g., C2 520) than a larger volume (e.g., C1 510).

FIG. 6 demonstrates ordering of children nodes in an example BVH 600 for a closest hit mode of operation, based on which one or more features of the disclosure can be implemented. The closest hit mode of operation is advantageous for rendering effects, such as global illumination and light reflection, where ray tracing involves searching for the closest intersecting primitive. FIG. 6 shows four bounding volumes: C1 610, C2 620, C3 630, and C4 640, associated with children nodes (e.g., one of the children nodes 210.1-4 of internal node 210, shown in FIG. 2). A ray to be traced originates from a location at the scene 660 and ends at a location at the scene 650 according to the ray length. Based on the ray's origin, length, and orientation, the ray intersects with only some of the volumes, that is, C1 610, C2 620, and C3 630. Hence, in order to find the closest primitive that the ray 650 intersects with, only the nodes associated with C1 610, C2 620, and C3 630 will be traversed. As mentioned above, to further speed up the time an intersecting primitive can be found, C1 610, C2 620, and C3 630 are ordered according to respective likelihood that a volume contains the sought-after ray-intersecting primitive. However, instead of ordering C1 610, C2 620, and C3 630 based on their respective distances to the ray's origin (as explained before in reference to FIGS. 4 and 5) C1 610, C2 620, and C3 630 are ordered based on respective average distances. That is the average of 1) a distance from the ray's origin to the location the ray enters the volume and 2) a distance from the ray's origin to the location the ray exits the volume. The ordering in this closest hit mode of operation is from the smallest to the largest average distance.

FIG. 6 illustrates the average distances according to which C1 610, C2 620, and C3 630 can be ordered. For example, a first average distance 680.1, associated with C1 610, is the average of 1) the distance from the ray's origin 660 to the location the ray enters C1 670.1 and 2) the distance from the ray's origin 660 to the location the ray exits C1 670.6. A second average distance 680.2, associated with C2 620, is the average of 1) the distance from the ray's origin 660 to the location the ray enters C2 670.2 and 2) the distance from the ray's origin 660 to the location the ray exits C2 670.3. A third average distance 680.3, associated with C3 630, is the average of 1) the distance from the ray's origin 660 to the location the ray enters C3 670.4 and 2) the distance from the ray's origin 660 to the location the ray exits C3 670.5.

Thus, the bounding volumes C1 610, C2 620, and C3 630, in the example illustrated in FIG. 6, are ordered in an ascending order, according to their respective average distances 680.1, 680.2, and 680.3, so that the node associated with C2 is traversed first, the node associated with C1 is traversed second, and the node associated with C3 is traversed last. This ordering method, as explained above, results in more efficient performance compared with ordering based on distance. This ordering method also results in predictable performance. Because, for example, if a ray's origin is internal to a bounding volume (as in FIG. 5), a negative distance need not be clamped when computing the average distance.

FIG. 7 demonstrates ordering of children nodes in an example BVH 700 for a first hit mode of operation, based on which one or more features of the disclosure can be implemented. The first hit mode of operation is advantageous for rendering effects, such as ambient occlusion and shadow, where tracing rays involves searching for any intersecting primitive (not necessarily the closest one). FIG. 7 shows four bounding volumes: C1 710, C2 720, C3 730, and C4 740, associated with children nodes (e.g., one of the children nodes 210.1-4 of internal node 210, shown in FIG. 2). A ray to be traced originates from a location at the scene 760 and ends at a location at the scene 750 according to the ray's length. Based on the ray's origin, length, and orientation, the ray 750 intersects with only some of the volumes, that is, C1 710, C2 720, and C3 730. Hence, in order to find the primitive that the ray intersects with, only the nodes that are associated with C1 710, C2 720, and C3 730 will be traversed. Since in this case the search is for any ray-intersecting primitive, the preferred approach is to first search the volume that is most likely to contain such a primitive, regardless of the distance of this volume from the ray origin. Accordingly, as disclosed herein, C1 710, C2 720, and C3 730 are ordered based on respective crossing distances. That is, the absolute difference between the location the ray enters the volume and the location the ray exits the volume. The ordering in this first hit mode of operation is from the largest to the smallest crossing distance.

FIG. 7 illustrates the crossing distances according to which C1 710, C2 720, and C3 730 can be ordered. For example, a first crossing distance 780.1, associated with C1 710, is the absolute difference between the location the ray enters C1 770.1 and the location the ray exits C1 770.6. A second crossing distance 780.2, associated with C2 720, is the absolute difference between the location the ray enters C2 770.2 and the location the ray exits C2 770.3. A third crossing distance 780.3, associated with C3 730, is the absolute difference between the location the ray enters C3 770.4 and the location the ray exits C3 770.5.

Thus, the volumes C1 710, C2 720, and C3 730, in the example illustrated in FIG. 7, are ordered in a descending order, according to their respective crossing distances 780.1, 780.2, and 780.3, from the largest to the smallest values. In this manner, the node associated with C1 is traversed first, the node associated with C2 is traversed second, and the node associated with C3 is traversed last. In this ordering method, since the goal is to find, as fast as possible, any primitive that intersects a given ray, it is more likely to find such a primitive starting from the volume through which the ray crosses along the largest distance, that is C1 in the example of FIG. 7. This ordering method also results in a predictable performance. For example, in a case where a ray's origin is internal to a bounding volume (as in FIG. 5 with respect to C2 520), to compute the crossing distance the first location (e.g., 570.2), if negative, is clamped to zero and the second location (where the ray exits C2), if beyond the location where the ray ends, is clamped to the location where the ray ends.

Figure 8:
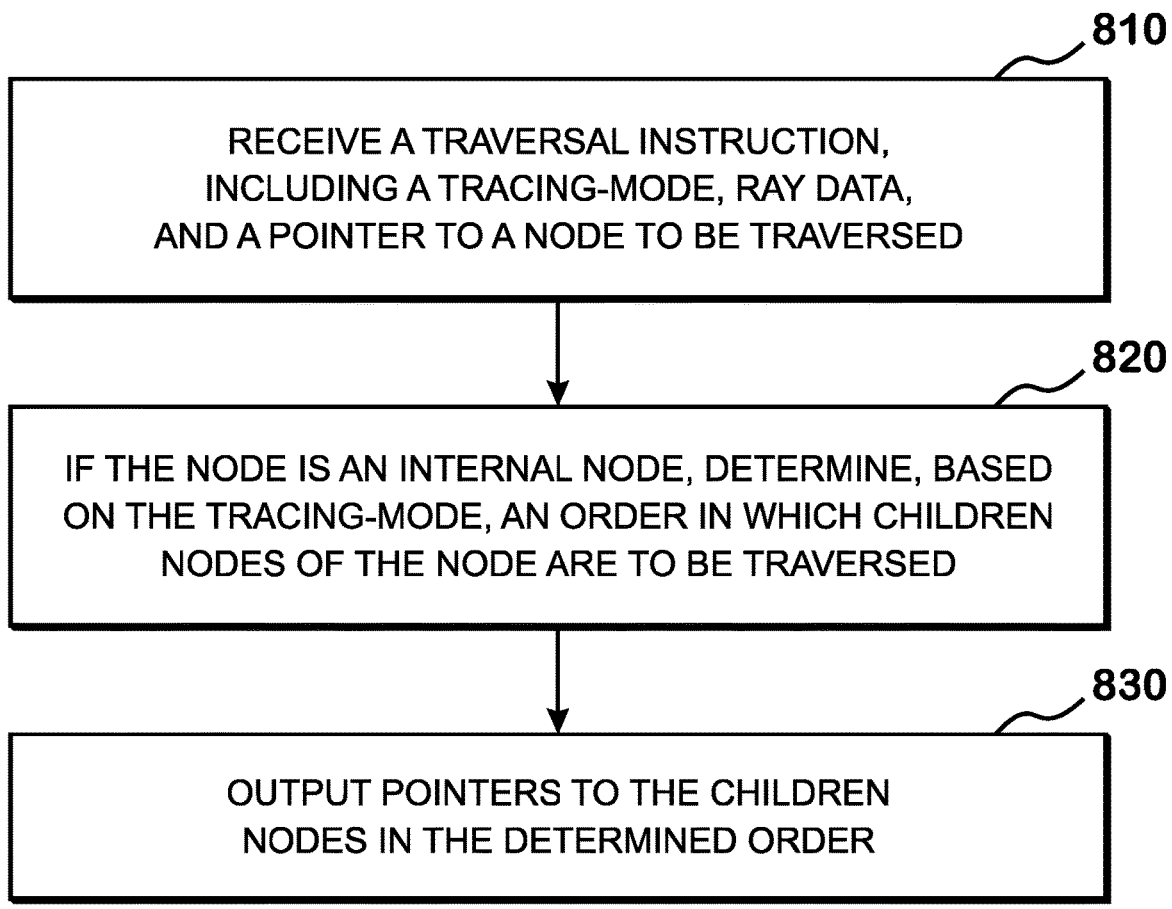
FIG. 8 is a flowchart of an example method for a ray tracing operation, based on which one or more features of the disclosure can be implemented.

FIG. 8 is a flowchart of an example method 800 for a ray tracing operation, based on which one or more features of the disclosure can be implemented. The method 800 comprises traversing nodes in a BVH tree 200, employed by the intersection engine 330. In step 810, a traversal instruction is received by the intersection engine 330, including a tracing-mode, ray data, and an identifier of a node (e.g., a pointer to a node) to be traversed. The tracing-mode comprises a closest hit mode and a first hit mode. The ray data comprises the origin, length, and orientation of the ray. If the node to be traversed is an internal node, the engine 330 further determine in step 820, based on the tracing-mode, an order in which children nodes of the node are to be traversed. Then, the engine 330, in step 830, outputs pointers to the children nodes in the determined order. As described in detail above, if the node to be traversed is an external node, the engine 330 is configured to traverse the leaves (primitives) of the node (that is, searching primitives contained within a volume associated with the node for a ray-intersecting primitive). In a next recursion, the engine 330 receives another traversal instruction, including the tracing-mode, the ray data, and a pointer to a node to be next traversed, the pointer is the first outputted pointer in the determined order.

It should be understood that many variations are possible based on the disclosure herein. For example, in some implementations, it is possible for software to explicitly specify the manner in which the children nodes are to be ordered for traversal. More specifically, software, such as a shader executing on a workgroup processor 132, or other software, such as software executing on the processor 102 or on another processor, requests an intersection test be performed for a ray against scene geometry. Software (such as the same or different software) also requests that the intersection test be performed with a particular child node ordering mode. This request specifies one of the criteria described herein, including the closest intersection point ordering mode (FIG. 5), the closest midpoint ordering mode (FIG. 6), or the longest intersection span ordering mode (FIG. 7). As a result of this request, the acceleration structure traversal stage 304 performs the intersection test using the specified sorting criterion.

In other implementations, a processor such as the accelerated processing unit 116, workgroup processor 132, the processor 102, or another processor, automatically determines which sorting order to use for a particular ray intersection test. In some examples, this automatic determination occurs by applying a heuristic to aspects of the request to perform the ray intersection test. In some examples, the heuristic includes determining whether the ray intersection test is performed with an any hit shader enabled, and also whether traversal through the bounding volume hierarchy operates in an early termination mode—that is, whether the traversal is set to terminate upon detecting a first hit with node geometry (e.g., a triangle in a leaf node). As described elsewhere herein, performing a ray intersection test involves traversing the bounding volume hierarchy and determining whether the ray intersects one or more leaf nodes. Shaders are executed as a result of certain events occurring during this test. An any hit shader executes each time it is determined that the ray intersects a leaf node. Any particular ray intersection test can execute with one or more any hit shaders enabled, or with no such any hit shaders enabled. Regarding the early termination mode, it is possible for a ray intersection test to search for and process multiple intersections between rays and leaf nodes, or to search for only one such intersection and then terminate traversal of the bounding volume hierarchy. For instance, if it is desired to find the closest hit, for instance for rendering opaque geometry, then traversal would generally require finding multiple intersections and identifying the closest such intersection. In a contrasting example, if it is desired to determine whether the ray is occluded by any geometry, then traversal could terminate early upon finding a single such intersection.

For automatic determination of the sorting criterion, in the situation that there are no any hit shaders set for a ray intersection test and early termination is active for a ray intersection test, the longest intersection span criterion is used. In the situation that early termination is not active and any hit shaders are not active, then the closest midpoint criterion is used. In the situation that any hit shaders are enabled, then the closest intersection criterion is used.

Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for traversing nodes in a bounding volume hierarchy (BVH) tree by an intersection engine, comprising:
   receiving a traversal instruction including a tracing-mode, ray data for a ray, and an identifier of a node to be traversed, wherein the tracing-mode comprises a closest hit mode and a first hit mode and the ray data includes a ray origin;
   in response to a condition where the node to be traversed is an internal node, determining, according to the tracing-mode, an order in which children nodes of the node are to be next traversed based on a respective distance to each respective children node among the children nodes; and
   outputting identifiers of the children nodes in the determined order for the traversal instruction,
   wherein the respective distance is calculated by averaging a first distance between the ray origin and a first location at which the ray enters a volume associated with a respective children node and a second distance between the ray origin and a second location at which the ray exits the volume for the traversal instruction.

2. The method of claim 1, further comprising:
   in response to a condition where the node to be traversed is an external node, traversing leaves of the node, including searching primitives that are contained within a volume associated with the node for a ray-intersecting primitive.

3. The method of claim 1, further comprising:
   receiving another traversal instruction, including the tracing-mode, the ray data, and an identifier of a node to be next traversed, the identifier is a first outputted identifier in the determined order.

4. The method of claim 1, wherein the ray data further comprises at least one of a length, or an orientation of a ray.

5. The method of claim 1, wherein the determined order orders the children nodes according to the respective distance in an ascending order.

6. The method of claim 1, further comprising:
receiving another traversal instruction including a tracing-mode, ray data for a ray, and an identifier of another node to be traversed, wherein the tracing-mode of the another traversal instruction comprises a first hit mode;
in response to a condition where the another node to be traversed is the internal node, determining, according to the tracing-mode, an order in which children nodes of the another node are to be next traversed based on a second respective distance to each respective children node among the children nodes; and
outputting identifiers of the children nodes in a determined order for the another traversal instruction,
wherein the second respective distance is computed based on a crossing distance that is an absolute difference between a first location at which the ray enters a volume associated with a respective children node for the another traversal instruction and a second location at which the ray exits the volume for the another traversal instruction and the determined order for the another traversal instruction orders the children nodes according to the respective distance in a descending order.

7. The method of claim 1, wherein when the first distance is negative, a value of zero is used as the first distance in the averaging.

8. A system for traversing nodes in a bounding volume hierarchy (BVH) tree, comprising:
at least one processor; and
memory storing instructions that, when executed by the at least one processor, cause the system to:
receive a traversal instruction including a tracing-mode, ray data for a ray, and an identifier of a node to be traversed, wherein the tracing-mode comprises a closest hit mode and a first hit mode and the ray data includes a ray origin;
in response to a condition where the node to be traversed is an internal node, determine, according to the tracing-mode, an order in which children nodes of the node are to be next traversed based on a respective distance to each respective children node among the children nodes; and
output identifiers of the children nodes in the determined order for the traversal instruction,
wherein the respective distance is calculated by averaging a first distance between the ray origin and a first location at which the ray enters a volume associated with a respective children node for the traversal instruction and a second distance between the ray origin and a second location at which the ray exits the volume for the traversal instruction.

9. The system of claim 8, wherein the instructions further cause the system to:
in response to a condition where the node to be traversed is an external node, traverse leaves of the node, including searching primitives that are contained within a volume associated with the node for a ray-intersecting primitive.

10. The system of claim 8, wherein the instructions further cause the system to:
receive another traversal instruction, including the tracing-mode, the ray data, and an identifier of a node to be next traversed, wherein the identifier is a first outputted identifier in the determined order.

11. The system of claim 8, wherein the ray data comprises at least one of a length, or an orientation of a ray.

12. The system of claim 8, wherein the determined order orders the children nodes according to the respective distance in an ascending order.

13. The system of claim 8, wherein the instructions further cause the system to:
receive another traversal instruction including a tracing-mode, ray data for a ray, and an identifier of another node to be traversed, wherein the tracing-mode of the another traversal instruction comprises a first hit mode;
in response to a condition where the another node to be traversed is the internal node, determine, according to the tracing-mode, an order in which children nodes of the another node are to be next traversed based on a second respective distance to each respective children node among the children nodes; and
output identifiers of the children nodes in a determined order for the another traversal instruction,
wherein the second respective distance is computed based on a crossing distance that is an absolute difference between a first location at which the ray enters a volume associated with a respective children node for the another traversal instruction and a second location at which the ray exits the volume for the another traversal instruction and the determined order for the another traversal instruction orders the children nodes according to the respective distance in a descending order.

14. The system of claim 8, wherein when the first distance is negative, a value of zero is used as the first distance in the averaging.

15. A non-transitory computer-readable medium comprising instructions executable by at least one processor to perform a method for traversing nodes in a bounding volume hierarchy (BVH) tree by an intersection engine, the method comprising:
receiving a traversal instruction, including a tracing-mode, ray data for a ray, and an identifier of a node to be traversed, wherein the tracing-mode of the traversal instruction comprises a closest hit mode and the ray data includes a ray origin;
in response to a condition where the node to be traversed is an internal node, determining, according to the tracing-mode, an order in which children nodes of the node are to be next traversed based on an average distance to each respective children node among the children nodes; and
outputting identifiers of the children nodes in the determined order,
wherein the average distance is calculated by averaging a first distance between the ray origin and a first location at which the ray enters a volume associated with a respective children node for the traversal instruction and a second distance between the ray origin and a second location at which the ray exits the volume for the traversal instruction.

16. The non-transitory medium of claim 15, further comprising:
in response to a condition where the node to be traversed is an external node, traversing leaves of the node, including searching primitives that are contained within a volume associated with the node for a ray-intersecting primitive.

17. The non-transitory medium of claim 15, further comprising:
receiving another traversal instruction, including the tracing-mode, the ray data, and an identifier of a node to be next traversed, wherein the identifier is a first outputted identifier in the determined order.

18. The non-transitory medium of claim 15, wherein the determined order orders the children nodes according to the respective distance in an ascending order.

19. The non-transitory medium of claim 15, further comprising:
receiving another traversal instruction, including a tracing-mode, ray data for a ray, and an identifier of another node to be traversed, wherein the tracing-mode of the another traversal instruction comprises a first hit mode,
in response to a condition where the another node to be traversed is the internal node, determining, according to the tracing-mode, an order in which children nodes of the another node are to be next traversed based on a second respective distance to each respective children node among the children nodes; and
outputting identifiers of the children nodes in a determined order for the another traversal instruction,
wherein the second respective distance is computed based on a crossing distance that is an absolute difference between a first location at which the ray enters a volume associated with a respective children node for the another traversal instruction and a second location at which the ray exits the volume for the another traversal instruction and a determined order for the another traversal instruction orders the children nodes according to the respective distance in a descending order.

20. The non-transitory medium of claim 15, wherein when the first distance is negative, a value of zero is used as the first distance in the averaging.

21. A method for traversing nodes in a bounding volume hierarchy (BVH) tree by an intersection engine, comprising:
receiving a traversal instruction, including a tracing-mode, ray data for a ray, and an identifier of a node to be traversed, wherein the tracing-mode of the traversal instruction comprises a first hit mode;
in response to a condition where the node to be traversed is an internal node, determining, according to the tracing-mode, an order in which children nodes of the node are to be next traversed based on a respective distance to each respective children node among the children node; and
outputting identifiers of the children nodes in the determined order,
wherein the respective distance is computed based on a crossing distance that is an absolute difference between a first location at which the ray enters a volume associated with a respective children node and a second location at which the ray exits the volume for the traversal instruction and the determined order for the traversal instruction orders the children nodes according to the respective distance in a descending order.

22. The method of claim 21, further comprising:
receiving another traversal instruction, including a tracing-mode, ray data for a ray, and an identifier of another node to be traversed, wherein the tracing-mode of the another traversal instruction a closest hit mode and the ray data includes a ray origin,
in response to a condition where the another node to be traversed is the internal node, determining, according to the tracing-mode, an order in which children nodes of the another node are to be next traversed based on a second respective distance to each respective children node among the children nodes; and
outputting identifiers of the children nodes in a determined order for the another traversal instruction,
wherein the second respective distance is computed based on a crossing distance that is an absolute difference between a first location at which the ray enters a volume associated with a respective children node and a second location at which the ray exits the volume for the another traversal instruction and the determined order for the another traversal instruction orders the children nodes according to the respective distance in a descending order.

23. A system for traversing nodes in a bounding volume hierarchy (BVH) tree, comprising:
at least one processor; and
memory storing instructions that, when executed by the at least one processor, cause the system to:
receive a traversal instruction, including a tracing-mode, ray data for a ray, and an identifier of a node to be traversed, wherein the tracing-mode of the traversal instruction comprises a first hit mode,
in response to a condition where the node to be traversed is an internal node, determine, according to the tracing-mode, an order in which children nodes of the node are to be next traversed based on a respective distance to each respective children node among the children nodes, and
output identifiers of the children nodes in the determined order for the traversal instruction,
wherein the respective distance is computed based on a crossing distance that is an absolute difference between a first location at which the ray enters a volume associated with a respective children node and a second location at which the ray exits the volume for the traversal instruction and the determined order for the traversal instruction orders the children nodes according to the respective distance in a descending order.

24. The system of claim 23, wherein the instructions further cause the system to:
receive another traversal instruction, including a tracing-mode, ray data for a ray, and an identifier of another node to be traversed, wherein the tracing-mode of the another traversal instruction comprises a closest hit mode and the ray data includes a ray origin,
in response to a condition where the another node to be traversed is the internal node, determining, according to the tracing-mode, an order in which children nodes of the another node are to be next traversed based on a second respective distance to each respective children node among the children nodes; and
output identifiers of the children nodes in a determined order for the another traversal instruction,
wherein the second respective distance is calculated by averaging a first distance between the ray origin and a first location at which the ray enters a volume associated with a respective children node for the another traversal instruction and a second distance between the ray origin and a second location at which the ray exits the volume for the another traversal instruction.

* * * * *